United States Patent [19]

Morita et al.

[11] 4,365,121
[45] Dec. 21, 1982

[54] TURN DIRECTION DETECTOR FOR A STEERING SHAFT

[75] Inventors: Masayuki Morita, Tokoname; Kazuhisa Kubota, Ichinomiya; Tasuku Nakano, Mizunami, all of Japan

[73] Assignee: Kabushiki Kaisha Tokai Rika Denki Seisakusho, Aichi, Japan

[21] Appl. No.: 212,226

[22] Filed: Dec. 2, 1980

[30] Foreign Application Priority Data

Dec. 7, 1979 [JP] Japan ............................. 54-168656[U]
Feb. 6, 1980 [JP] Japan ............................. 55-12809[U]

[51] Int. Cl.³ ..................... H01H 3/16; H01H 9/00; H01J 40/14
[52] U.S. Cl. ........................... 200/61.27; 200/61.54; 250/215; 335/206

[58] Field of Search ............... 200/61.27–61.38, 200/61.54, 296, 294; 335/205–207; 250/200, 215, 229

[56] References Cited

U.S. PATENT DOCUMENTS

| 2,152,450 | 3/1939 | Arcelon | 200/61.31 |
| 2,667,545 | 1/1954 | Leonard | 200/61.31 |
| 3,559,205 | 1/1971 | Colby | 200/61.54 X |
| 3,745,352 | 7/1973 | Low et al. | 250/229 X |

*Primary Examiner*—J. R. Scott
*Attorney, Agent, or Firm*—Wenderoth, Lind & Ponack

[57] ABSTRACT

A turn direction detector for detecting the turn of a steering shaft includes a first switch arrangement which is actuated in response to the clockwise rotation of the steering shaft, and a second switch arrangement which is actuated in response to the counterclockwise rotation of the steering shaft.

19 Claims, 22 Drawing Figures

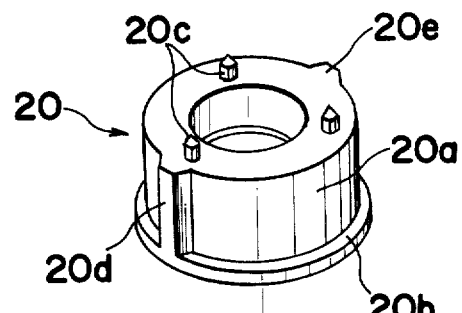
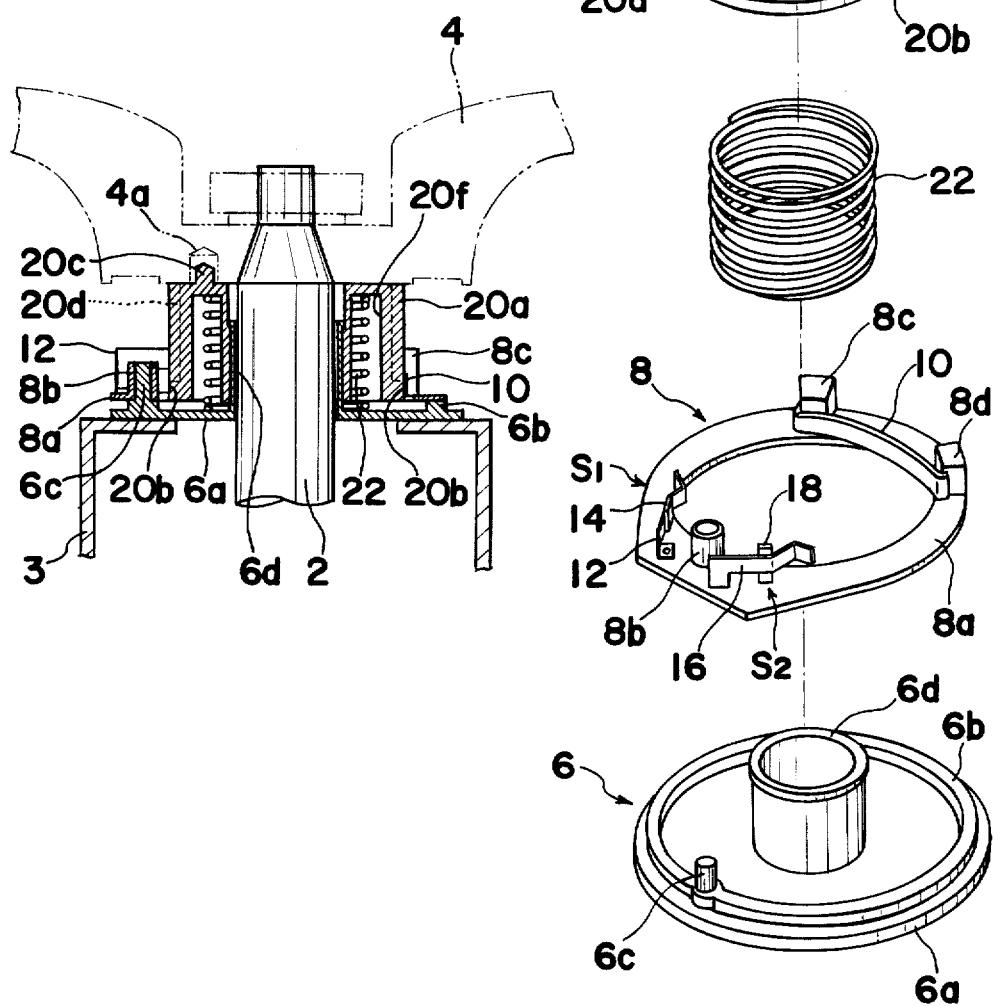

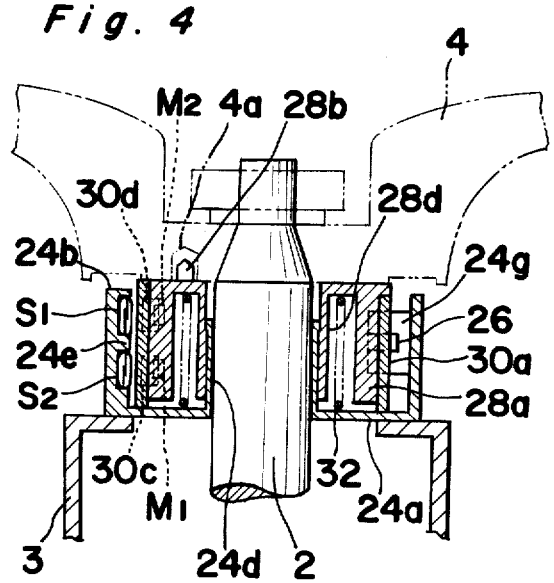
Fig. 4
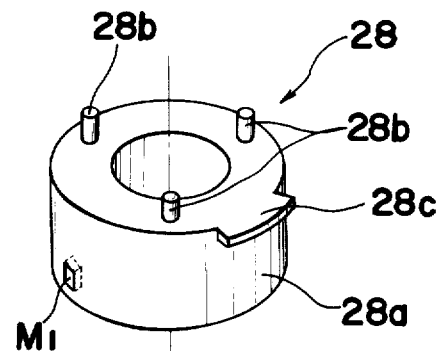
Fig. 5
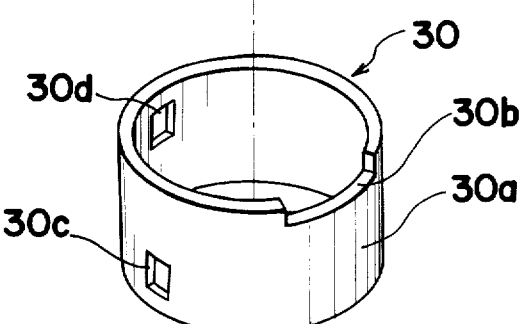
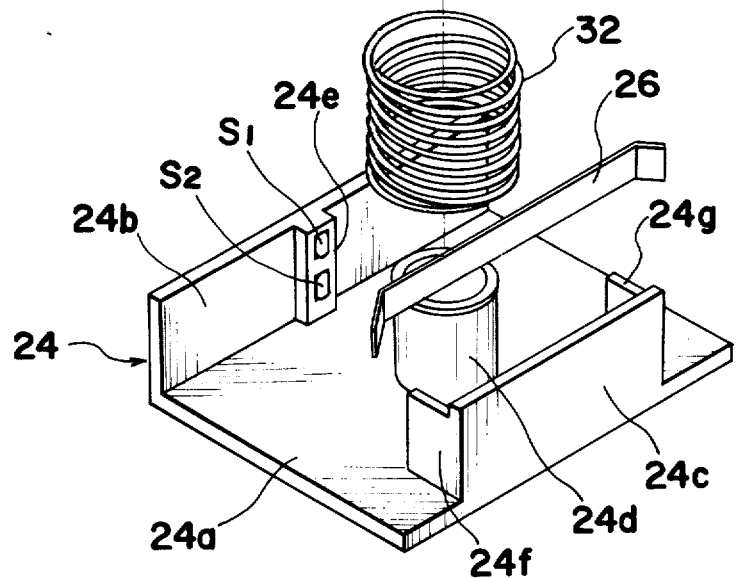

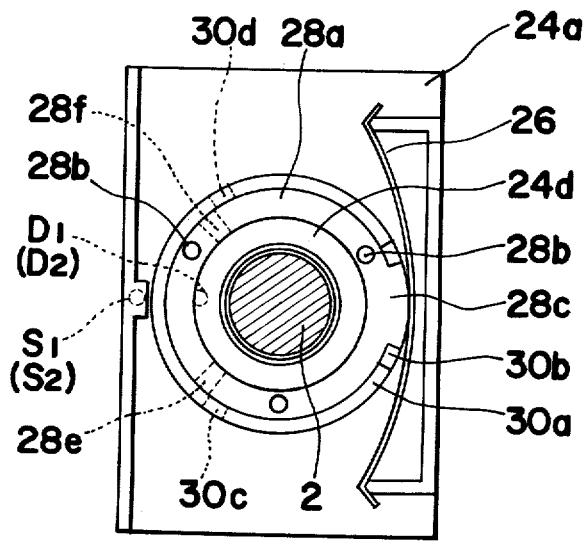
Fig. 10
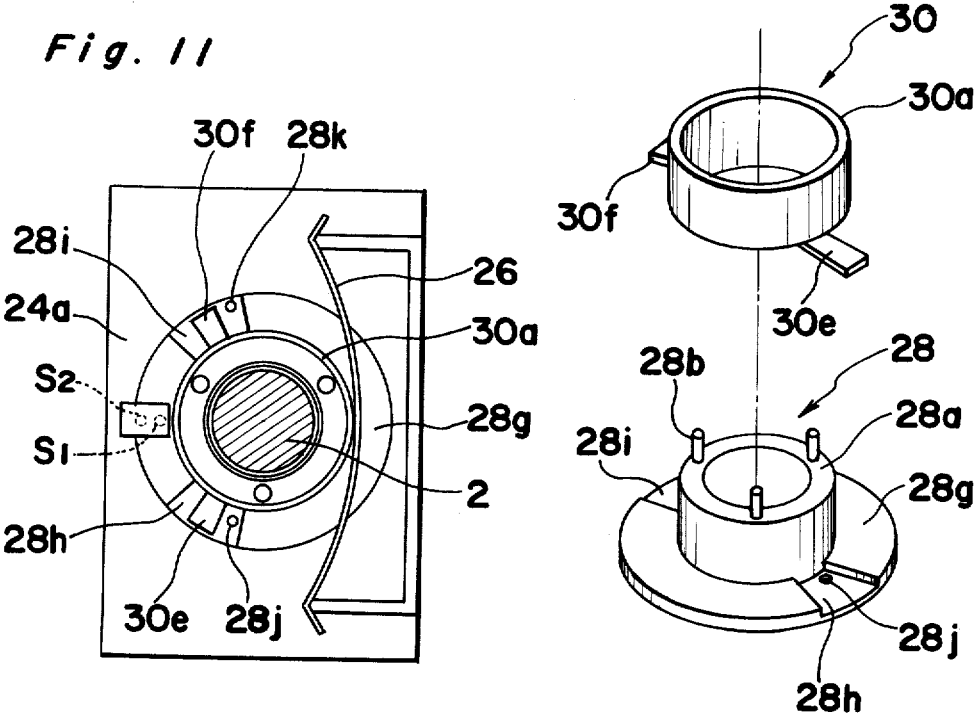
Fig. 11
Fig. 12

TURN DIRECTION DETECTOR FOR A STEERING SHAFT

BACKGROUND OF THE INVENTION

The present invention relates to a turn indicator system for use in an automobile, and more particularly, to a detector for detecting the direction of turn of a steering shaft.

Generally, an automobile has a turn indicator system including a turn indicator lever provided at a position within reach of a driver and adjacent to, for example, a steering wheel, for tilting or pivotal movement in clockwise and counterclockwise directions from a neutral position, a switch unit provided in association with the turn indicator lever, and right and left indicator lamps, the right indicator lamp or lamps being actuated to blink when the turn indicator lever is tilted clockwise, and the left indicator lamp or lamps being actuated to blink when the turn indicator lever is tilted counterclockwise.

The turn indicator system of the above described typical arrangement further includes an automatic cancellation mechanism provided in association with the steering wheel to automatically return the tilted indicator lever to the neutral position after the completion of turning movement of the automobile.

According to the prior art turn indicator system, the automatic cancellation mechanism is totally formed by a mechanical arrangement which is bulky in size, which is provided essentially in the vicinity of and in association with the turn indicator lever and thus which occupies a large space under the steering wheel, resulting in reduced freedom of choice of design for the accommodation of the turn indicator system.

Recently, due to the development of electronics, many changes and variations have been made to the layout of instruments in a dashboard in a sophisticated manner, and for this purpose, some devices and systems require reorganization in such a manner as to improve the adaptability of the installation. As to the turn indicator system, it is required to provide an electrical circuit means which maintains the indicator system in an actuated condition once the indicator lever has been tilted, and also releases the system from the actuated condition to a non-actuated condition when the steering wheel is rotated in a direction opposite to the direction of turn of the automobile. Such an electrical circuit means is disclosed in detail in a copending U.S. patent application Ser. No. 211,718, filed Dec. 1, 1980, and assigned to the same assignee as the present case. To control the electrical circuit means, it is necessary to provide a detecting means for detecting the direction of turn of the steering wheel.

SUMMARY OF THE INVENTION

Accordingly, it is a primary object of the present invention to provide a turn direction detector for detecting the direction of turn of the steering shaft.

It is also a primary object of the present invention to provide a turn direction detector of the above described type which is simple in construction and can readily be manufactured at low cost.

In accomplishing these and other objects, a turn direction detector according to the present invention comprises a support member fixedly connected to a housing of a steering shaft. The support member has an opening formed therein for rotatably receiving the steering shaft therethrough. A rotator member is fixedly connected to the steering shaft for rotation together with the steering shaft, and has an actuating means. First and second switch means, which are capable of being actuated by the actuating means, are carried by the support member. The turn direction detector further comprises means for disabling the actuating means to actuate the first switch means during counterclockwise rotation of the rotator member and means for disabling the actuating means to actuate the second switch means during clockwise rotation of the rotator member.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which:

FIG. 1 is a cross-sectional view of a turn direction detector according to the first embodiment of the present invention;

FIG. 2 is an exploded view of the turn direction detector of FIG. 1;

FIG. 4 is a cross-sectional view of a turn direction detector according to the second embodiment of the present invention;

FIG. 5 is an exploded view of the turn direction detector of FIG. 4;

FIG. 10 is a top plan view of a turn direction detector according to the fifth embodiment of the present invention;

FIG. 11 is a top plan view of a turn direction detector according to the six embodiment of the present invention;

FIG. 12 is an exploded view of elements employed in the turn direction detector of FIG. 11;

DETAILED DESCRIPTION OF THE INVENTION

Figure 3A:
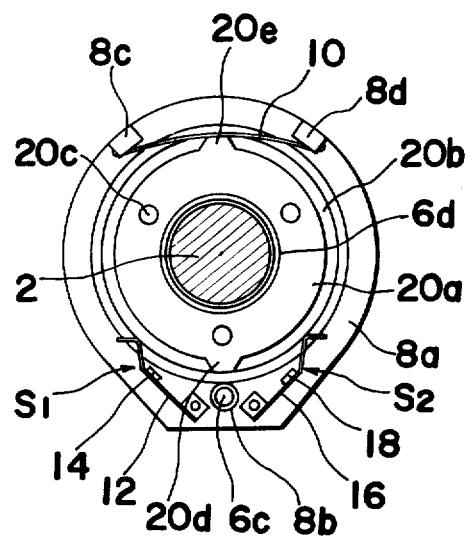
FIGS. 3a to 3d are top plan views showing various operating positions of the turn direction detector of FIG. 1.

Referring to FIGS. 1 and 2, a turn direction detector of the first embodiment of the present invention is provided around and in association with a steering shaft 2 at a position adjacent to a steering wheel 4, and comprises, as best shown in FIG. 2, a support 6 formed by an annular plate 6a having a central opening, a wall 6b mounted on the perimeter of the disc plate 6a, a pin projection 6c mounted on the wall 6b and extending in a direction parallel to the axis of the annular plate 6a and a cylinder 6d mounted on the annular plate 6a in coaxial relation to the central opening in the plate 6a to slidingly receive therein the steering shaft 2. It is to be noted that the support 6 is fixedly connected to a housing, or a steering shaft column 3 of the steering shaft 2.

A pivotal member 8 includes a ring 8a formed by an electrically non-conductive material and having an opening formed thereon, at the edge of which opening is provided a bearing 8b, and a pair of projections 8c and 8d formed approximately on the side opposite to the bearing 8b. A spring plate 10 is bridged between the projections 8c and 8d. A pair of switch arrangements S1 and S2 are disposed adjacent to the bearing 8b. The switch arrangement S1 comprises an elongated plate 12 made of an electrically conductive material having one end rigidly connected to the ring 8a and the other end disposed in the central circular opening of the ring 8a. It is to be noted that such other end of the elongated plate 12 is bent into the shape of a V for facilitating a contact with column projections 20d and 20e as will be explained later. The switch arrangement S1 further comprises a contact member 14 which is made of an electrically conductive material and mounted on the ring 8a. Since the elongated plate 12 is normally held in contact with the contact member 14 by the resiliency of the plate 12, the switch arrangement S1 forms a normally closed switch. The switch arrangement S2 also includes an elongated plate 16 and a contact member 18 which are arranged in the same manner as those of the switch arrangement S1. The pivotal member 8 is placed on the support 6 with the pin projection 6c inserted into the bearing 8b and with the ring 8a resting on top of the wall 6b.

The turn direction detector of the first embodiment further comprises a cam member 20 formed by a cylindrical body 20a having a bore formed therethrough for slidably receiving the cylinder 6d. Provided around the bottom and of the cylindrical body 20a is a flange 20b which slidably contacts the spring plate 10 when the cam member 20 is placed on the support 6. Three projections 20c are mounted on the top surface of the cylindrical body 20a for engagement with recesses 4a formed in the steering wheel 4. A pair of column projections 20d and 20e are formed on the opposite sides of the body 20a. It is to be noted that the body 20a is further formed with a concave 20f (FIG. 1) which is opened at the bottom surface of the body 20a for receiving a coil spring 22 to urge the cam member 20 towards the steering wheel 4. The operation of the turn direction detector of the first embodiment is explained below.

Figure 3C:
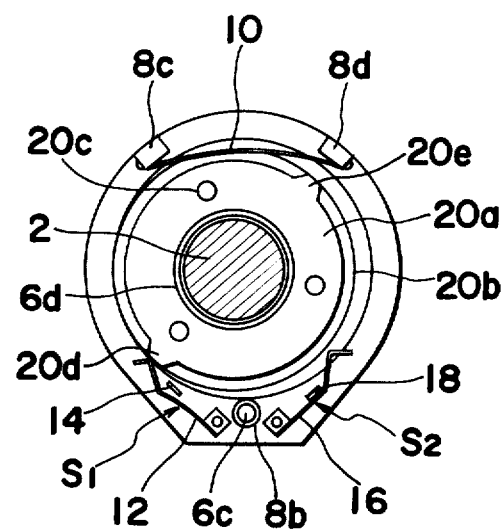
Figure 3B:
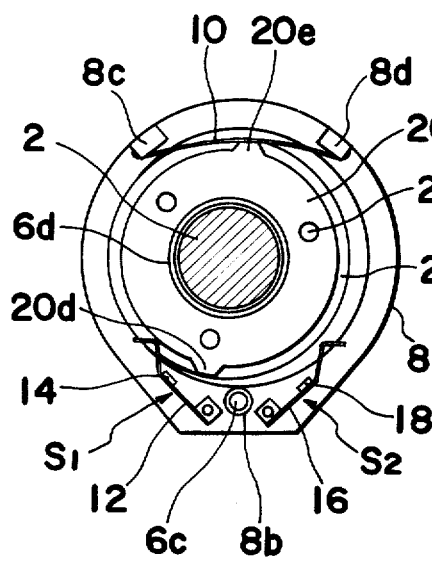

After making a required turn of the automobile, the steering wheel 4 is returned to a position so as to align the front wheels (not shown) straightforward. In this case, when the steering wheel starts to return, one of the column projections, for example the projection 20d is located intermediately between the switch arrangements S1 and S2 with the center of the ring 8a aligned coaxially with the longitudinal axis of the steering shaft 2, as shown in FIG. 3a. In this position, the V-shaped ends of the respective elongated plates 12 and 16 are located away from the cylindrical body 20a to maintain the switch arrangements S1 and S2 in the closed condition. When the steering wheel 4 is rotated, for example, in a clockwise direction, the cam member 20 is rotated together therewith to provide a clockwise rotational force to the pivotal member 8 by friction between the flange 20b and the spring plate 10. Accordingly, the pivotal member 8 makes a clockwise pivotal movement about the pin projection 6c until the inner surface of the ring 8a contacts the flange 20b, as shown in FIG. 3b. In this position, the V-shaped end of the elongated plate 12 is still held away from but closer to the cylindrical body 20a. During the further clockwise rotation of the steering wheel 4, since the flange 20b is held in contact with the spring plate 10 and the inner surface of the ring 8a, the column projection 20d comes into contact with the V-shaped end of the elongated plate 12 to push the elongated plate 12 away from the contact member 14, resulting in opening of the switch arrangement S1, as shown in FIG. 3c.

Figure 3D:
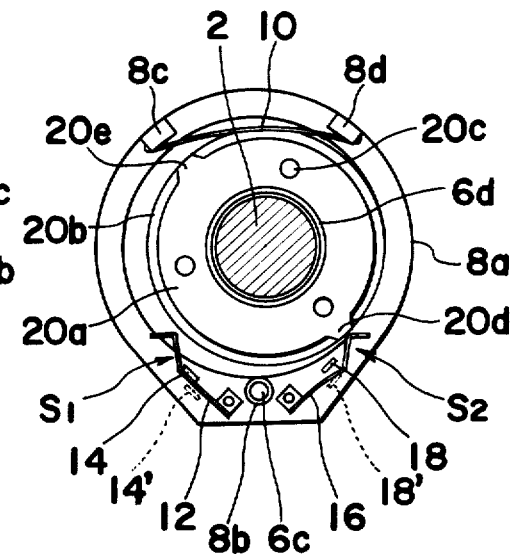

On the other hand, when the steering wheel 4 is rotated in a counterclockwise direction, the pivotal member 8 is pivoted counterclockwise about the pin projection 6c, as shown in FIG. 3d, to cause the switch arrangement S2 to result in the open condition when the column projections 20d and 20e push the V-shaped end of the elongated plate 16 apart from the contact member 18.

As understood from the foregoing description, during the clockwise rotation of the steering wheel 4, the switch arrangement S1 is intermittently opened and the switch arrangement S2 is maintained closed, whereas during the counterclockwise rotation of the steering wheel 4, the switch arrangement S1 is maintained closed and the switch arrangement S2 is intermittently opened. Thus, it can be said that the switch arrangements S1 and S2 detect clockwise and counterclockwise rotations, respectively, of the steering wheel 4. Such actuations of the normally closed switch arrangements S1 and S2 provide signal indicative of rotation of the steering shaft 2 to a control circuit which will be described later in connection with FIG. 14.

It is to be noted that each of the switch arrangements S1 and S2 can be rearranged to be a normally opened type switch by the employment of another contact member 14'(18') on the side of the elongated plate 12(16) opposite to the contact member 14(18) as shown by imaginary lines in FIG. 3d. In this case, the switch arrangements S1 and S2 must be coupled with a control circuit described later in connection with FIG. 13.

Referring to FIGS. 4 and 5, a turn direction detector according to the second embodiment of the present invention comprises a support 24 formed by a base plate 24a having a central opening, walls 24b and 24c extending perpendicularly from the opposite sides of the base plate 24a in a face-to-face relation with each other and a cylinder 24d mounted on the base plate 24a in coaxial relation to the central opening in the plate 24a to slidingly receive therein the steering shaft 2. It is to be noted that the support 24 is fixedly connected to the housing 3 of the steering shaft 2. The wall 24b has a column 24e projecting from the center portion of the wall 24b towards the cylinder 24d for carrying two microreed switches S1 and S2 aligned parallel to the axis of the cylinder 24d. The wall 24c has two arms 24f and 24g extending from the opposite ends of the wall 24c towards the wall 24b. The arms 24f and 24g are provided for bearing a spring plate 26 having a length longer that the distance between the two arms 24f and 24g. The spring plate 26 is installed in such a manner that its opposite end portions are placed in contact with respective edges of the arms 24f and 24g so that when a shielding drum 30 as will be explained later is mounted on the cylinder 24d, the spring plate 26 is bent towards the wall 24c to provide a tight contact with the shielding drum 30.

Figure 6A:
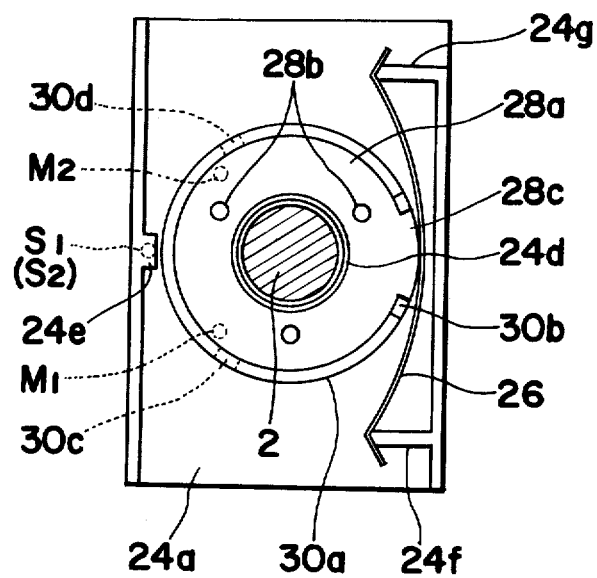
FIGS. 6a to 6c are top plan views showing various operating positions of the turn direction detector of FIG. 4.

Mounted on the cylinder 24d are rotator 28 and shielding drum 30. First, the rotator 28 is explained. The rotator 28 is formed by a cylindrical body 28a having a bore formed therethrough for slidably receiving the cylinder 24d. Three projections 28b are mounted on the top surface of the cylindrical body 28a for engagement with recesses 4a formed in the steering wheel 4. A tongue 28c protrudes laterally outwardly from the top surface of the cylindrical body 28a. Mounted in the cylindrical body 28a are two permanent magnets M1 and M2, in which the permanent magnet M1 is located adjacent to the bottom edge of the cylindrical body 28a, and the permanent magnet M2 is located adjacent to the top edge of the cylindrical body 28a, so that magnets M1 and M2 may confront the microreed switches S2 and S1, respectively, during the rotation of the rotator 28 about the cylinder 24d. The permanent magnets M1 and M2 are, when viewed from the top, spaced a predetermined angle about the axis of the rotator 28, as best shown in FIG. 6a. It is to be noted that the body 28a is further formed with a concave 28d (FIG. 4) which is opened at the bottom surface of the body 28a for receiving a coil spring 32 to urge the rotator 28 towards the steering wheel 4.

The shielding drum 30 made of magnetically shielding material is formed by a drum 30a having an inner diameter slightly greater than the outer diameter of the cylindrical body 28a for slidably receiving the rotator 28 therein. The top edge portion of the drum 30 is formed with a recess 30b which receives the tongue 28c of the rotator 28. The width of the recess 30b is wider than that of the tongue 28c for allowing the rotator 28 to turn for a small angle inside the shielding drum 30. Formed in the side surface of the drum 30 are two windows 30c and 30d. The window 30c is located adjacent to the bottom edge of the drum 30 and the window 30d is located adjacent to the top edge of the drum 30. The windows 30c and 30d are, when viewed from the top, spaced a predetermined angle about the axis of the drum, as shown in FIG. 6a, such angle being greater than that explained above between the two permanent megnets M1 and M2. Since the shielding drum 30 is slidingly held in contact with the spring plate 26 in the manner described above, the friction produced between the shielding drum 30 and the spring plate 26 results in a braking effect on the shielding drum 30. The operation of the turn direction detector of the second embodiment is explained below.

Figure 6B:
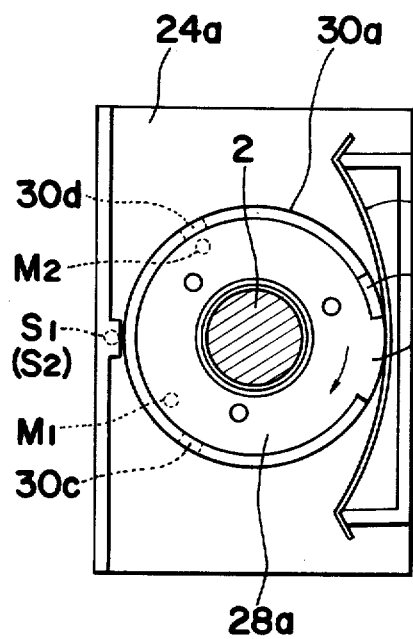
Figure 6C:
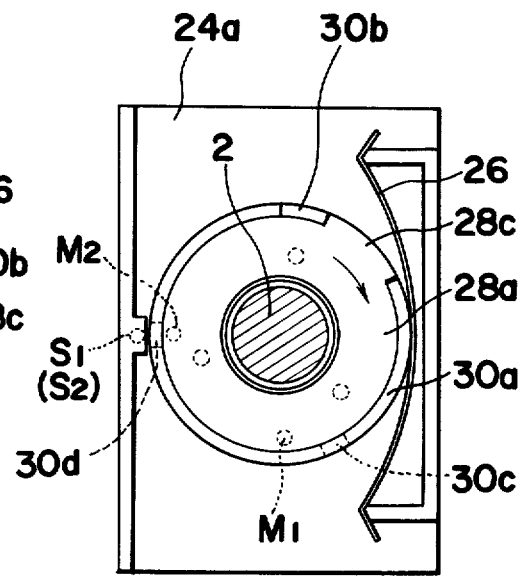

After making a required turn of the automobile, the steering wheel 4 is returned to a position so as to align the front wheels (not shown) straightforward. In this case, when the steering wheel starts to return the tongue 28c of the rotator 28 is positioned intermediately between the opposite ends of the recess 30b of the drum 30, while the permanent magnets M1 and M2 are held out of alignment with the windows 30c and 30d, as shown in FIG. 6a. When the steering wheel 4 is rotated slightly clockwise, only the rotator 28 is rotated clockwise until the tongue 28c comes into contact with one edge of the recess 30b, as shown in FIG. 6b. In this position, the permanent magnet M2 is held in alignment with the window 30d whereas the permanent magnet M1 is held out of alignment with the window 30c so that the magnetic force from only the permanent magnet M2 leaks out from the shielding drum 30. Such a relation between the rotator 28 and the shielding drum 30 is maintained during the further clockwise rotation of the steering wheel 4. Accordingly, during the clockwise rotation of the steering wheel 4, the permanent magnet M2 directly confronts the microreed switch S1 through the window 30d, as shown in FIG. 6c, to actuate the microreed switch S1.

On the contrary, when the steering wheel 4 is rotated counterclockwise, the rotator 28 engages with the shielding drum 30 in such a manner as to align the permanent magnet M1 with the window 30c to actuate the microreed switch S2 during the counterclockwise rotation of the steering wheel 4.

As will be understood from the foregoing description, the microreed switches S1 and S2 detect clockwise and counterclockwise rotations, respectively, of the steering wheel 4.

It is to be noted that each of the microreed switches S1 and S2 may be a normally opened type switch that closes when actuated or may be a normally closed type switch that opens when actuated.

It is also to be noted that the angle between the permanent magnets M1 and M2 as well as that between the windows 30c and 30d can be selected to be any desired angle, so long as the permanent magnets M1 and M2 may be moved into alignment with the corresponding windows 30c and 30d in the manner described above.

According to the second embodiment described above, since the switches S1 and S2 are actuated without any contact, the elements constituting the switch arrangements can be prevented from wearing. Furthermore, the steering wheel 4 can be turned smoothly.

Figure 7:
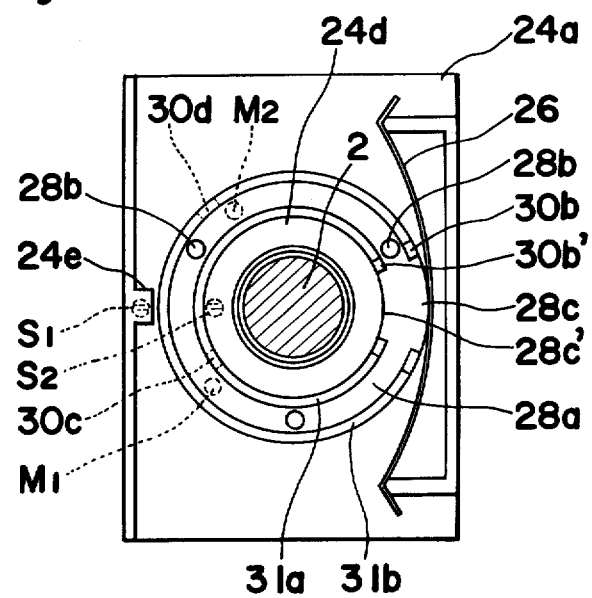
FIG. 7 is a top plan view of a turn direction detector according to the third embodiment of the present invention.

Referring to FIG. 7, there is shown a turn direction detector according to the third embodiment of the present invention. According to this embodiment, the microreed switch S2 is provided, instead of below the microreed switch S1 as described in the second embodiment, in the cylinder 24d of the support 24 in a face-to-face relation with the microreed switch S1. The shielding drum 30 is formed by an inner drum 31a and an outer drum 31b which are rigidly connected with each other at respective bottom ends. The inner and outer drums 31a and 31b have windows 30c and 30d, respectively, at the same level with respect to each other but spaced a predetermined angle from each other about the axis of the shielding drum 30. The drums 31a and 31b also have, respectively, recesses 30b' and 30b having the same angular width. The rotator 28 has two tongues 28c and 28c' is slidably inserted in a space between the inner and outer drums 31a and 31b. It is to be noted that the permanent magnets M1 and M2 carried by the rotator 28 are at the same level with respect to each other. The operation of the turn direction detector of the third embodiment is explained below.

When the steering wheel 4 is rotated clockwise, the permanent magnet M1 comes into alignment with the window 30c and thereafter when the permanent magnet M1 moves past the switch S2 it actuates the switch S2. In this case, since the permanent magnet M2 is shielded by the inner shield drum 31a, the microreed switch S2 will not be actuated by the permanent magnet M2. A similar operation is carried out when the steering wheel 4 is rotated counterclockwise. As understood from the foregoing, the microreed switches S2 and S1 detect clockwise and counterclockwise rotations, respectively, of the steering wheel 4. It is to be noted that the turn direction detector of the third embodiment can be coupled to the control circuits of FIGS. 13 or 14, depending on the type of microreed switches S1 and S2 employed, whether they are of the normally opened type or normally closed type.

According to the arrangement of the third embodiment, since the switches S1 and S2, as well as the permanent magnets M1 and M2 and windows 30c and 30d, can be held in the same plane, the height of the turn direction detector of the third embodiment measured in the axial direction can be made smaller than that of the second embodiment.

Figure 8:
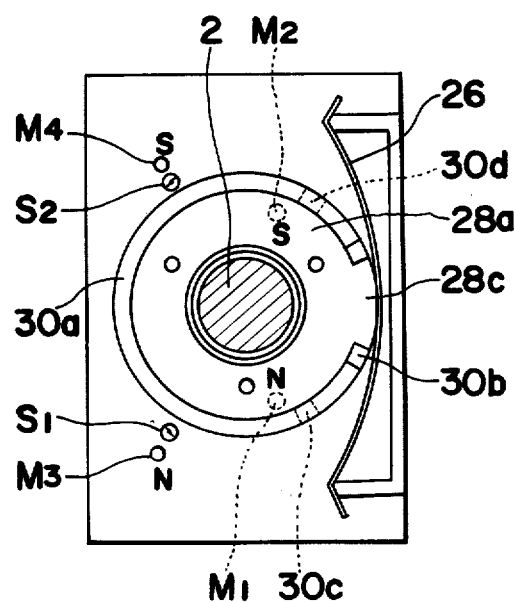
FIG. 8 is a top plan view of a turn direction detector according to the fourth embodiment of the present invention.
Figure 9A:
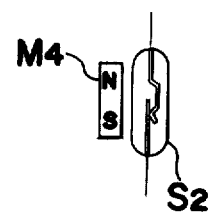
FIGS. 9a to 9d are diagrammatic views showing the relationship between a microreed switch and a permanent magnet.
Figure 9B:
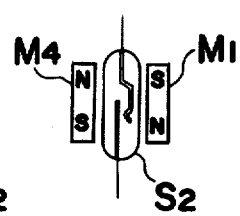
Figure 9C:
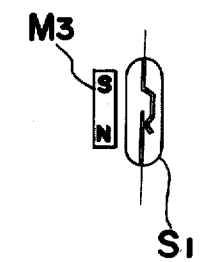
Figure 9D:
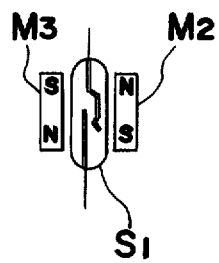

Referring to FIG. 8, there is shown a turn direction detector according to the fourth embodiment of the present invention. According to this embodiment, the employed microreed switches are normally opened type but are rearranged to actuate as normally closed type. The microreed switches S1 and S2 are disposed around the shielding drum 30 at a predetermined angular spacing from each other about the center of the drum 30. The microreed switches S1 and S2 are coupled with auxiliary permanent magnets M3 and m4, respectively, in such a manner as to maintain the respective microreed switches S1 and S2 in a closed condition, as diagrammatically shown in FIG. 9a and 9c. The permanent magnets M1 and M2 and the windows 30c and 30d are provided in such a manner that the permanent magnet M1 comes into alignment with the window 30c during the counterclockwise rotation of the steering wheel 4 and the permanent magnet M2 comes into alignment with the window 30d during the clockwise rotation of the steering wheel 4. Since the permanent magnets M1 and M2, as well as the windows 30c and 30d are disposed in the same plane as that containing the microreed switches S1 and S2, the permanent magnet M1 or M2 confronts through the respective windows the respective microreed switches S2 and S1. However, since the auxiliary permanent magnets M3 and M4, particularly their polarities, are disposed in opposite relation with respect to each other, the permanent magnet M1 which is provided in opposite relation to the permanent magnet M4 actuates only the microreed switch S2 to break the contact thereof, as shown in FIG. 9b, and the permanent magnet M2 actuates only the microreed switch S1 to break the contact thereof, as shown in FIG. 9d. Accordingly, microreed switches S1 and S2 detect clockwise and counterclockwise rotations, respectively, of the steering wheel 4.

Figure 14:
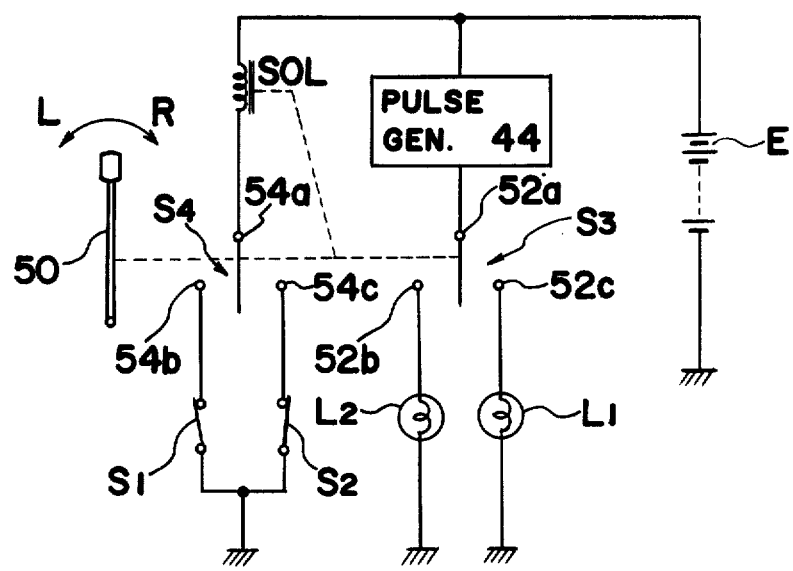
FIG. 14 is a circuit diagram showing a control circuit which is operatively provided in association with any one of the above embodiments with a normally closed type switch.

The turn direction detector of the fourth embodiment is coupled to the control circuit of FIG. 14.

Referring to FIG. 10, there is shown a turn direction detector according to the fifth embodiment of the present invention. This embodiment has a structure similar to that of the second embodiment but differs in a point that the switches S1 and S2 are formed by light sensing elements, such as a photo-transistors. To actuate the photo-transistors S1 and S2, light emitting diodes D1 and D2 are mounted in the cylinder 24d in face-to-face relation with the photo-transistors S1 and S2, respectively. Instead of mounting the permanent magnets M1 and M2, the rotator 28 is formed with through-holes 28e and 28f which come into alignment with the windows 30c and 30d, respectively, during the counterclockwise and clockwise rotation of the steering wheel 4 to actuate the photo-transistors S1 and S2. Since the turn direction detector of the fifth embodiment operates in a similar manner to that of the second embodiment, the explanation of its operation is omitted.

Figure 13:
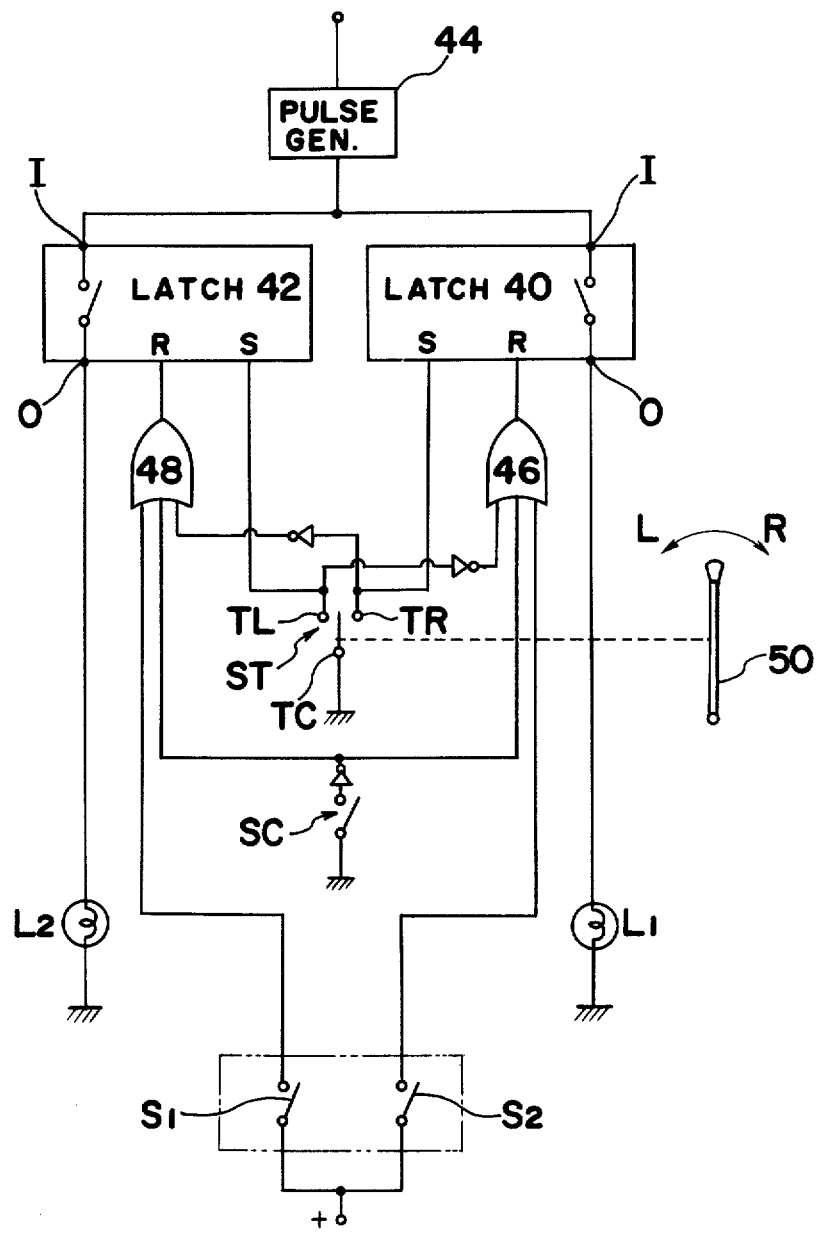
FIG. 13 is a circuit diagram showing a control circuit which is operatively provided in association with any one of the above embodiments with a normally opened type switch employed for detection.

It is to be noted that the turn direction detector of the fifth embodiment can be coupled to the control circuits of FIGS. 13 or 14 depending on the type of photo-transistor, whether it is a normally opened type or normally closed type.

Referring to FIGS. 11 and 12, there is shown a turn direction detector of the sixth embodiment of the present invention. According to this embodiment, the rotator 28 is formed at its bottom end with a flange 28g having two thin gauged sections 28h and 28i which are spaced a predetermined angle with respect to each other about the center of the rotator 28. The thin gauged section 28h is formed with a through-hole 28j located adjacent to the outer surface of the cylindrical body 28a and the thin gauged section 28i is formed with a similar through-hole 28k located remote from the outer surface of the cylindrical body 28a. The shielding drum 30 has a pair of fins 30e and 30f protruding laterally outwardly from the drum 30a. When the cylindrical body 28a of the rotator 28 is inserted into the shielding drum 30, the fins 30e and 30f are loosely fitted in the thin gauged sections 28h and 28i, respectively, to allow a slight rotation of the rotator 28 within the drum 30a. Accordingly, when the steering wheel 4 is rotated clockwise, the fin 30f engages with one edge of the thin gauged section 28i to cover the through-hole 28k, and at the same time, the fin 30e engages with one edge of the thin gauged section 28h to maintain the through-hole 28j opened. On the contrary, when the steering wheel 4 is rotated counterclockwise, the fin 30f terminates at a position which is not in alignment with the through-hole 28k and the fin 30e terminates at a position to cover the through-hole 28j. Provided on the base plate 24a of the support 24 are two sets of mark sensing devices S1 and S2 each comprising a light emitting element and light receiving element which are positioned above and below the flange 28g, respectively. The mark sensing device S1 is provided to detect the through-hole 28j during the clockwise rotation of the steering wheel 4 and the mark sensing device S2 is provided to detect the through-hole 28k during the counterclockwise rotation of the steering wheel 4. When the mark sensing device S1 or S2 detects the corresponding through-hole, it produces a high or low level signal, depending on the type of light receiving element employed, as an indication of detection of the direction of rotation of the steering wheel 4. As will be understood to those skilled in the art, a light receiving element that produces a high level signal upon receipt of light from the light emitting diode corresponds to the normally opened type switch and a light receiving element that produces a low level signal corresponds to the normally closed type switch.

Referring to FIG. 13, a control circuit which is operatively provided in association with a turn direction detector employing a normally opened type switch for the switches S1 and S2 comprises latches 40 and 42 each having an input terminal I and an output terminal O. The input terminals I of the respective latches 40 and 42 are connected to a pulse generator 44, and the output terminals O are connected to right and left indicator lamps L1 and L2, respectively. Each of the latches 40 and 42 further has a set terminal S which receives a negative going pulse for establishing an electrical connection between the input and output terminals I and O, and a reset terminal R which receives a high level signal for disconnecting the terminals I and O.

A turn indicator switch ST provided in association with a turn indicator lever 50 has three terminals TR, TL and TC in which the terminals TR and TL are connected, respectively, directly to the set terminals S of the latches 40 and 42, and the terminal TC is connected to ground. When the turn indicator lever 50 is tilted rightwardly, the terminals TC and TR of the turn indicator switch ST are connected with each other, and when it is tilted leftwardly, the terminals TC and TL are connected with each other.

Connected to the reset terminal R of the latch 40 is an OR gate 46 having three inputs which are respectively connected to the terminals TL of the turn indicator switch ST through an inverter, a cancellation switch SC through an inverter, and the normally opened type switch S2 of any one of the previous embodiments. Similarly, the reset terminal R of the latch 42 is connected to an OR gate 48 having three inputs which are connected respectively to the terminal TR of the turn indicator switch ST through an inverter, the cancellation switch SC through the inverter, and the normally opened type switch S1 of any of said one of the previous embodiments. The operation of the control circuit of FIG. 13 is explained below.

When the turn indicator lever 50 is tilted, for example, rightwardly, a negative going pulse is applied to the set terminal S of the latch 40 for connecting the input and output terminals I and O of the latch 40 to supply a train of pulse signals to the right indicator lamp L1 and, therefore, the right indicator lamp L1 subsequently blinks.

The cancellation of the right turn indicator can be carried out manually by turning the cancellation switch S2 on or by tilting the turn indicator lever 50 leftwardly, or by the closure of the normally opened switch S2 effected when the right turn of the automobile is completed, i.e., when the steering wheel 4 is rotated counterclockwise. It is to be noted that a similar operation is carried out for a left turn indication.

Referring to FIG. 14, there is shown a control circuit which is operatively provided in association with the turn direction detector employing a normally closed type switch for the switches S1 and S2. The control circuit of FIG. 14 comprises switches S3 and S4 and a solenoid SOL. The switch S3 includes a terminal 52a connected through the pulse generator 44 to a power source E, and terminals 52b and 52c connected, respectively, to the left and right turn indicator lamps L2 and L1, which are in turn connected to ground. The switch S4 includes a terminal 54a connected through the solenoid SOL to the power source E, and terminals 54b and 54c connected, respectively, to the normally closed switches S1 and S2 which are in turn connected to ground. The switches S3 and S4 are normally held in a neutral position as shown in FIG. 14 and are provided in association with the turn indicator lever 50 and mechanically coupled with the colenoid SOL. The operation of the control circuit of FIG. 14 is explained below.

When the turn indicator lever 50 is tilted, for example, rightwardly, the switches S3 and S4 are so actuated that the terminal 52a is connected with the terminal 52c and the terminal 54a is connected with the terminal 54c. By the connection between the terminals 52a and 52c of the switch S3, the turn indicator lamp L1 starts to blink by the pulse signal obtained from the pulse generator 44, and by the connection between the terminals 54a and 54c of the switch S4, the solenoid SOL is energized to maintain the switches S3 and S4 in the above mentioned connected position. After the completion of right turn of the automobile, the steering wheel 4 is rotated counterclockwise to open the switch S2 in the above described manner, resulting in de-energization of the solenoid SOL. Accordingly, the switches S3 and S4 are returned to their neutral position to stop blinking the indicator lamp L1.

Since the turn direction detector of the present invention is not provided mechanically in association with the turn indicator lever 50, it is possible to provide the turn direction detector of the present invention at a position remote from the steering wheel 4. When such an arrangement is employed, a space directly under the steering wheel 4 can be utilized to install other control arrangements, such as, control arrangements for controlling window wipers, various lights, etc.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of the appended claims.

What is claimed is:

1. A turn direction detector for detecting the direction of turning of a steering shaft of an automobile, said detector comprising:

a support member adapted to be fixedly connected to a housing of the steering shaft, said support member having an opening for rotatably receiving therethrough the steering shaft;

a rotator member adapted to be fixedly connected to the steering shaft to be rotatable therewith and to be rotatable with respect to said support member;

first switch means supported by said support member and capable of being in an actuated condition and a nonactuated condition;

second switch means supported by said support member and capable of being in an actuated condition and a nonactuated condition;

actuator means on said rotator member for, upon clockwise rotation of said rotator member, causing said first switch means to be in said actuated condition thereof, thereby providing a detection of clockwise turning of the steering shaft, and for, upon counterclockwise rotation of said rotator member, causing said second switch means to be in said actuated condition thereof, thereby providing a detection of counterclockwise turning of the steering shaft; and means, operable by said rotator member, for, upon said clockwise rotation of said rotator member, maintaining said second switch means in said nonactuated condition thereof, and for, upon said counterclockwise rotation of said rotator member, maintaining said first switch means in said nonactuated condition thereof.

2. A turn direction detector for detecting the direction of turning of a steering shaft of an automobile, said detector comprising:

a support member adapted to be fixedly connected to a housing of the steering shaft, said support member having a first opening for rotatably receiving therethrough the steering shaft, said support member having an engaging member;

a rotator member adapted to be fixedly connected to the steering shaft to be rotatable therewith and to be rotatable with respect to said support member, said rotator member having an annular flange;

a pivotal member positioned on said support member and having an engageable member in engagement with said engaging member, such that said pivotal member is pivotable with respect to said support member, said pivotal member having a second opening loosely receiving therethrough said rotator member;

force transmitting means, provided between said annular flange of said rotator member and said pivotal member, for, upon clockwise rotation of said rotator member, causing clockwise pivoting movement of said pivotal member about said engaging member with respect to said support member and said rotator member until said pivotal member comes into contact with said annular flange at a first pivoted position, and for, upon counterclockwise rotation of said rotator member, causing counterclockwise pivoting movement of said pivotal member about said engaging member with respect to said support member and said rotator member until said pivotal member comes into contact with said annular flange at a second pivoted position;

first and second switch means mounted on said pivotal member on respective opposite sides of said engageable member thereof, each of said first and second switch means including an element movable between a respective switch actuated position and a respective switch nonactuated position; and actuator means on said rotator member for, when said pivotal member is in said first pivoted position thereof and upon clockwise rotation of said rotator member, moving said element of said first switch means to said actuated position thereof, thereby providing a detection of clockwise turning of the steering shaft, and for, when said pivotal member is in said second pivoted position thereof and upon counterclockwise rotation of said rotator member, moving said element of said second switch means to said actuated position thereof, thereby providing a detection of counterclockwise rotation of the steering shaft.

3. A detector as claimed in claim 2, wherein said actuator means comprises a projection extending outwardly from said rotator member, said element of said first switch means comprises a first elongated plate having a first end rigidly connected to said pivotal member and a second end extending into said second opening at a position to be contacted and moved by said projection to said respective actuated position only when said pivotal member is in said first pivoted position thereof, and said element of said second switch means comprises a second elongated plate having a first end rigidly connected to said pivotal member and a second end extending into said second opening at a position to be contacted and moved by said projection to said respective actuated position only when said pivotal member is in said second pivoted position thereof.

4. A detector as claimed in claim 3, wherein said first switch means further includes a first contact member positioned at a location to be in contact with said first elongated plate in said respective nonactuated position and to be out of contact with said first elongated plate in said respective actuated position, and said second switch means further includes a second contact member positioned at a location to be in contact with said second elongated plate in said respective nonactuated position and to be out of contact with said second elongated plate in said respective actuated position.

5. A detector as claimed in claim 2, wherein said first switch means further includes a first contact member positioned at a location to be out of contact with said first elongated plate in said respective nonactuated position and to be in contact with said first elongated plate in said respective actuated position, and said second switch means further includes a second contact member positioned at a location to be out of contact with said second elongated plate in said respective nonactuated position and to be in contact with said second elongated plate in said respective actuated position.

6. A detector as claimed in claim 2, wherein said force transmitting means comprises a spring plate bridged between projections on said pivotal member at a location thereon opposite said engageable member with respect to said second opening, said spring plate being in frictional engagement with said annular flange of said rotator member.

7. A turn direction detector for detecting the direction of turning of a steering shaft of an automobile, said detector comprising:

a support member adapted to be fixedly connected to a housing of the steering shaft, said support member having an opening for rotatably receiving therethrough the steering shaft;

a rotator member adapted to be fixedly connected to the steering shaft to be rotatable therewith and to be rotatable with respect to said support member, said rotator member having an engaging portion;

first and second permanent magnets mounted on and rotatable with said rotator member for generating respective first and second magnetic fields;

a shield member mounted on said rotator member for rotation therewith, said shield member having an engageable portion in engagement with said engaging portion of said rotator member, such that, upon clockwise and counterclockwise rotation of said rotator member, said shield member undergoes limited rotation with respect to said rotator member to first and second positions, respectively;

first and second windows provided in said shield member at locations such that when said shield member is in said first position thereof with respect to said rotator member said first window is aligned with said first permanent magnet while said second window is out of alignment with said second permanent magnet, and such that when said shield member is in said second position thereof with respect to said rotator member said second window is aligned with said second permanent magnet while said first window is out of alignment with said first permanent magnet;

magnetically responsive first switch means, mounted on said support member at a location to receive said first magnetic field from said first permanent magnet through said first window upon clockwise rotation of said rotator member, for generating a signal indicative of clockwise turning of the steering shaft; and magnetically responsive second switch means, mounted on said support member at a location to receive said second magnetic field from said second permanent magnet through said second window upon counterclockwise rotation of said rotator member, for generating a signal indicative of counterclockwise turning of the steering shaft.

8. A detector as claimed in claim 7, wherein said first and second switch means comprise respective normally open microreed switches.

9. A detector as claimed in claim 7, wherein said first and second switch means comprise respective normally closed microreed switches.

10. A detector as claimed in claim 7, further comprising a brake member provided between said support member and said shield member.

11. A detector as claimed in claim 10, wherein said brake member comprises a spring plate having opposite ends thereof supported by said support member and an intermediate portion in frictional engagement with said shield member.

12. A detector as claimed in claim 7, wherein said first and second permanent magnets are spaced circumferentially about said rotator member by a first angular distance, and said first and second windows are spaced circumferentially about said shield member by a second angular distance different than said first angular distance.

13. A turn direction detector for detecting the direction of turning of a steering shaft of an automobile, said detector comprising:
a support member adapted to be fixedly connected to a housing of the steering shaft, said support member having an opening for rotatably receiving therethrough the steering shaft;
a rotator member adapted to be fixedly connected to the steering shaft to be rotatable therewith and to be rotatable with respect to said support member, said rotator member having first and second wall portions having extending therethrough respective first and second apertures, said rotator member having engaging means;
first and second light sources carried by said support member at positions on first sides of said first and second wall portions, respectively, of said rotator member to be aligned with said first and second apertures, respectively, upon rotation of said rotator member with respect to said support member;
a shield member mounted on said rotator member for rotation therewith, said shield member having engageable means in engagement with said engaging means of said rotator member, such that, upon clockwise and counterclockwise rotation of said rotator member, said shield member undergoes limited rotation with to said rotator member to first and second positions respectively;

said shield member including first and second shielding sections at locations such that, when said shield member is in said first position thereof with respect to said rotator member during clockwise rotation of said rotator member, said second shielding section is in alignment with said second aperture in said rotator member and said first aperture in said rotator member is unshielded by said first shielding section, and such that, when said shield member is in said second position thereof with respect to said rotator member during counterclockwise rotation of said rotator member, said first shielding section is in alignment with said first aperture in said rotator member and said second aperture in said rotator member is unshielded by said second shielding section;
first light responsive means, carried by said support means at a location on a second side of said first wall portion of said rotator member in opposed relation to said first light source to receive light from said first light source through said first aperture during clockwise rotation of said rotator member, for generating a signal indicative of clockwise turning of the steering shaft; and
second light responsive means, carried by said support means at a location on a second side of said second wall portion of said rotator member in opposed relation to said second light source to receive light from said second light source during counterclockwise rotation of said rotator member, for generating a signal indicative of counterclockwise turning of the steering shaft.

14. A detector as claimed in claim 13, wherein said rotator member comprises a cylindrical body having extending coaxially therethrough a bore.

15. A detector as claimed in claim 14, wherein said first and second wall portions comprise sections of said cylindrical body.

16. A detector as claimed in claim 14, wherein said first and second wall portions comprise sections of an annular flange extending radially outwardly from said cylindrical body.

17. A detector as claimed in claim 16, wherein said first and second shielding sections comprise first and second fins extending radially outwardly from said shield member.

18. A detector as claimed in claim 13, wherein each said light responsive means produces a high level signal upon receipt of light.

19. A detector as claimed in claim 13, wherein each said light responsive means produces a low level signal upon receipt of light.

* * * * *